(12) United States Patent
McKinney et al.

(10) Patent No.: US 8,319,445 B2
(45) Date of Patent: Nov. 27, 2012

(54) MODIFIED DIMMING LED DRIVER

(75) Inventors: Steven McKinney, Piney Flats, TN (US); Isay Goltman, Sliema (MT)

(73) Assignee: Boca Flasher, Inc., Boca Raton, FL (US)

( * ) Notice: Subject to any disclaimer, the term of this patent is extended or adjusted under 35 U.S.C. 154(b) by 741 days.

(21) Appl. No.: 12/385,613

(22) Filed: Apr. 14, 2009

(65) Prior Publication Data
US 2009/0261748 A1     Oct. 22, 2009

Related U.S. Application Data

(60) Provisional application No. 61/071,150, filed on Apr. 15, 2008.

(51) Int. Cl.
*H05B 37/02* (2006.01)
(52) U.S. Cl. ........................................ 315/224; 315/307
(58) Field of Classification Search ............. 315/DIG. 4, 315/307, 308, 224, 209 R, 291, 185 R, 193, 315/187, 188
See application file for complete search history.

(56) References Cited

U.S. PATENT DOCUMENTS

| | | | | |
|---|---|---|---|---|
| 7,443,113 B2* | 10/2008 | Crouse et al. | ................. | 315/308 |
| 2010/0213859 A1* | 8/2010 | Shteynberg et al. | .......... | 315/224 |

OTHER PUBLICATIONS

National Semiconductor, Application Note 556, National.com, Sep. 2002.
Super Nade, "Understanding Buck Regulators", Overclockers.com, Nov. 24, 2006.
Microchip Technology, Inc., "High-Speed, Microcontroller-Adaptable, Pulse Width Modulator", MCP1630/MCP1630V, www.microchip.com, 2005.
Microchip Technology, Inc., "MCP1630 Boost Mode LED Driver Demo Board User's Guide", www.microchip.com, 2007.

* cited by examiner

*Primary Examiner* — David Hung Vu
(74) *Attorney, Agent, or Firm* — John J. Yim

(57) ABSTRACT

A driver circuit produces variable current output for an LED lighting system providing improved dimming capability and greater power efficiency when responding to industry standard lighting dimmers, through the use of an input voltage monitoring circuit which variably controls the current output of a switching regulator. Output current modulation methods such as analog, PWM, Pulse Frequency Modulation, or other digital modulation, and combination or hybrid methods may be employed. The current invention marries such output modulation techniques with a control method which is derived through intelligent monitoring of the input voltage waveform. The circuit and method described is adapted to higher current applications such as LED lighting systems using the latest high-power LEDs.

15 Claims, 11 Drawing Sheets

Fig. 1 Typical LED Luminous Intensity vs. Forward Current
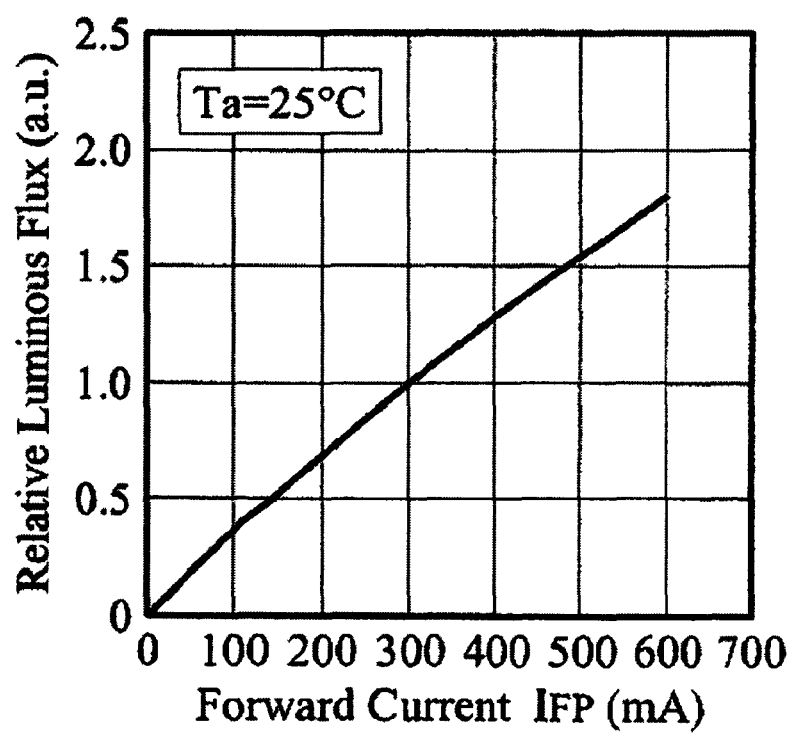

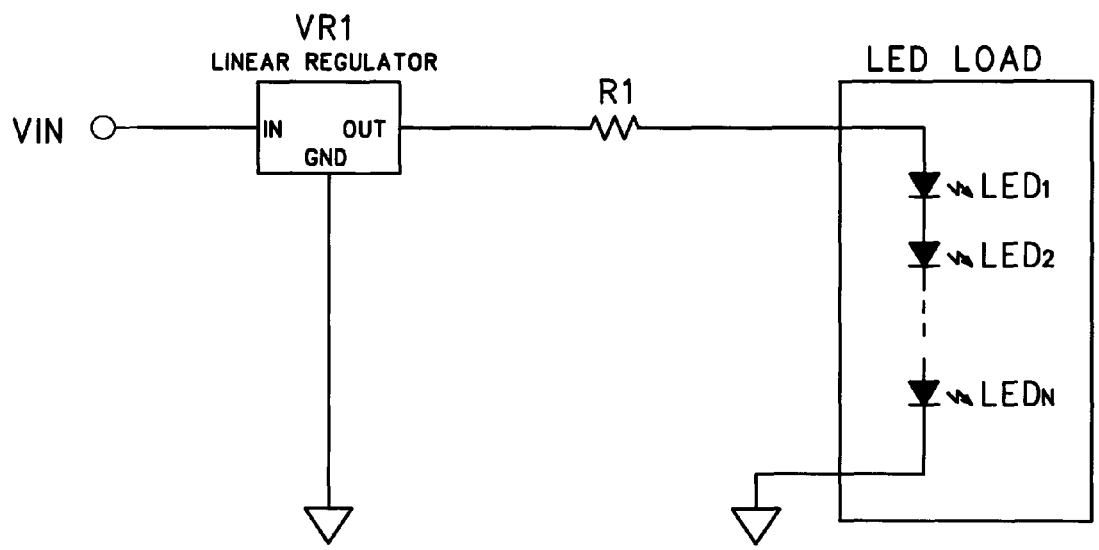
Fig. 2 Linear Regulator Driving LED Load

Fig. 3 Luminous Intensity vs. Input Voltage In A Linear Regulated LED Driving Circuit
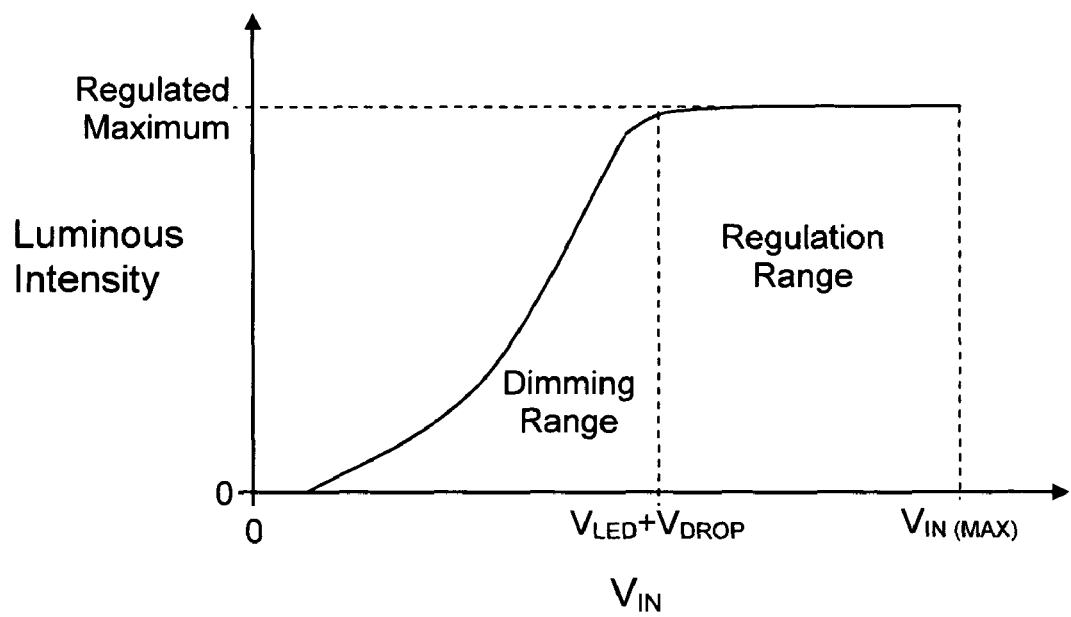

Fig. 4 Non-Linear Dimming Response In A Linear Regulated LED Driving Circuit
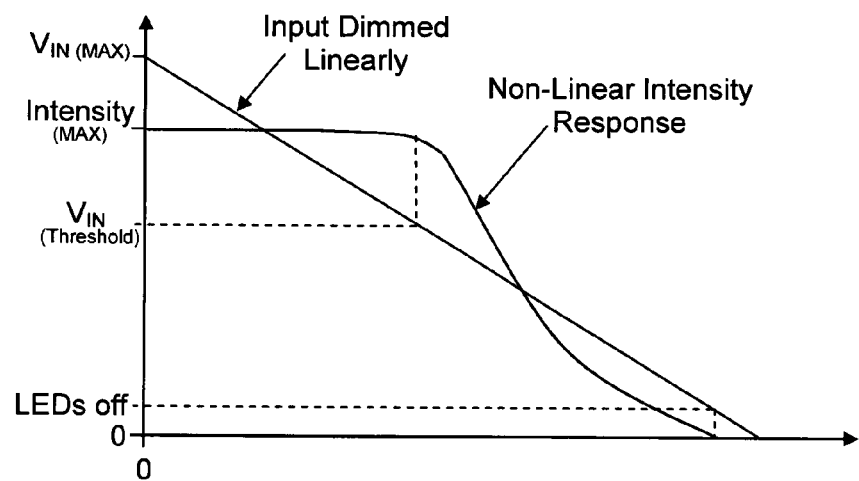

Fig. 5 Forward Phase Control AC Waveform With Dimmer Set To Half
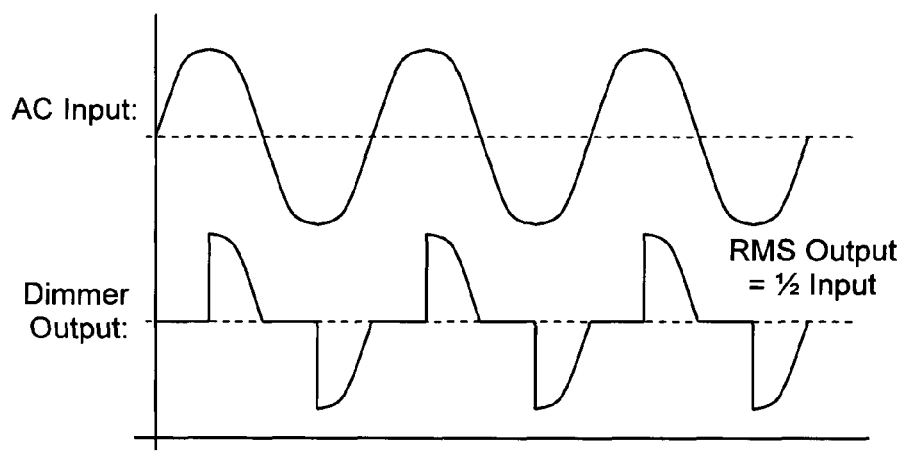

Fig. 6 Reverse Phase Control AC Waveform With Dimmer Set To Half
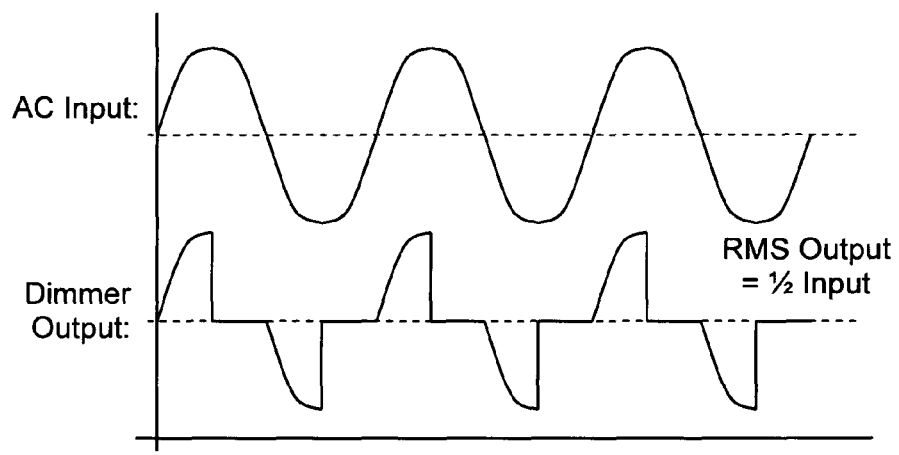

Fig. 7 AC Waveform From Autotransformer Set To Half
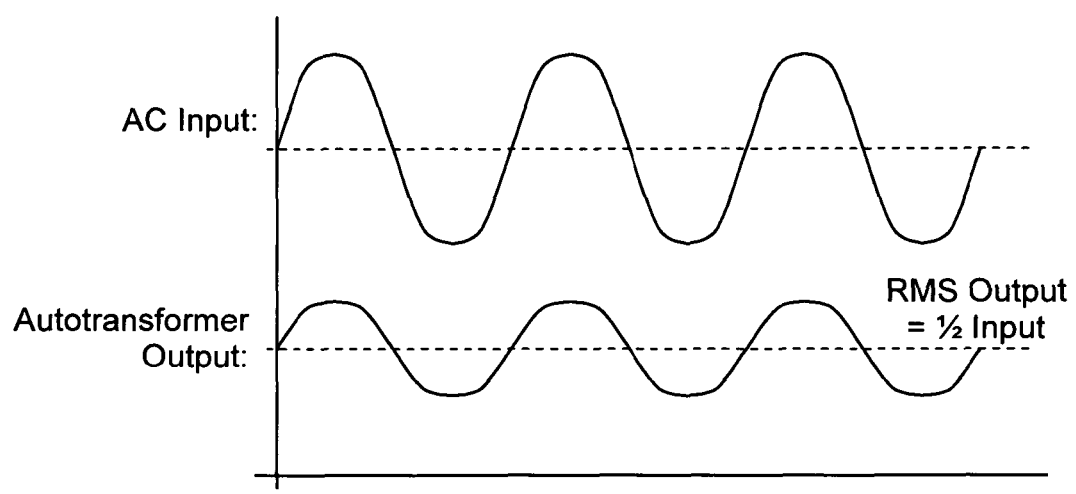

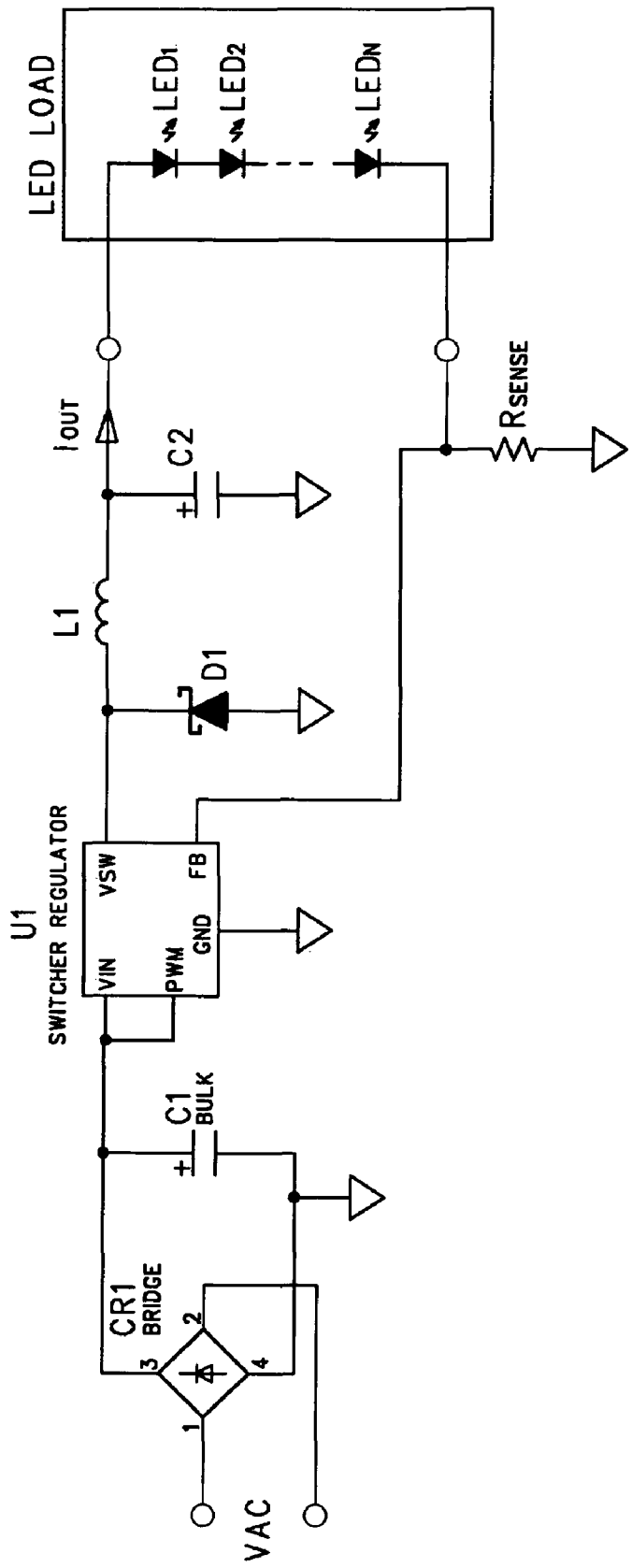
Fig. 8 Constant Current Buck Switching Regulator Led Driver Circuit

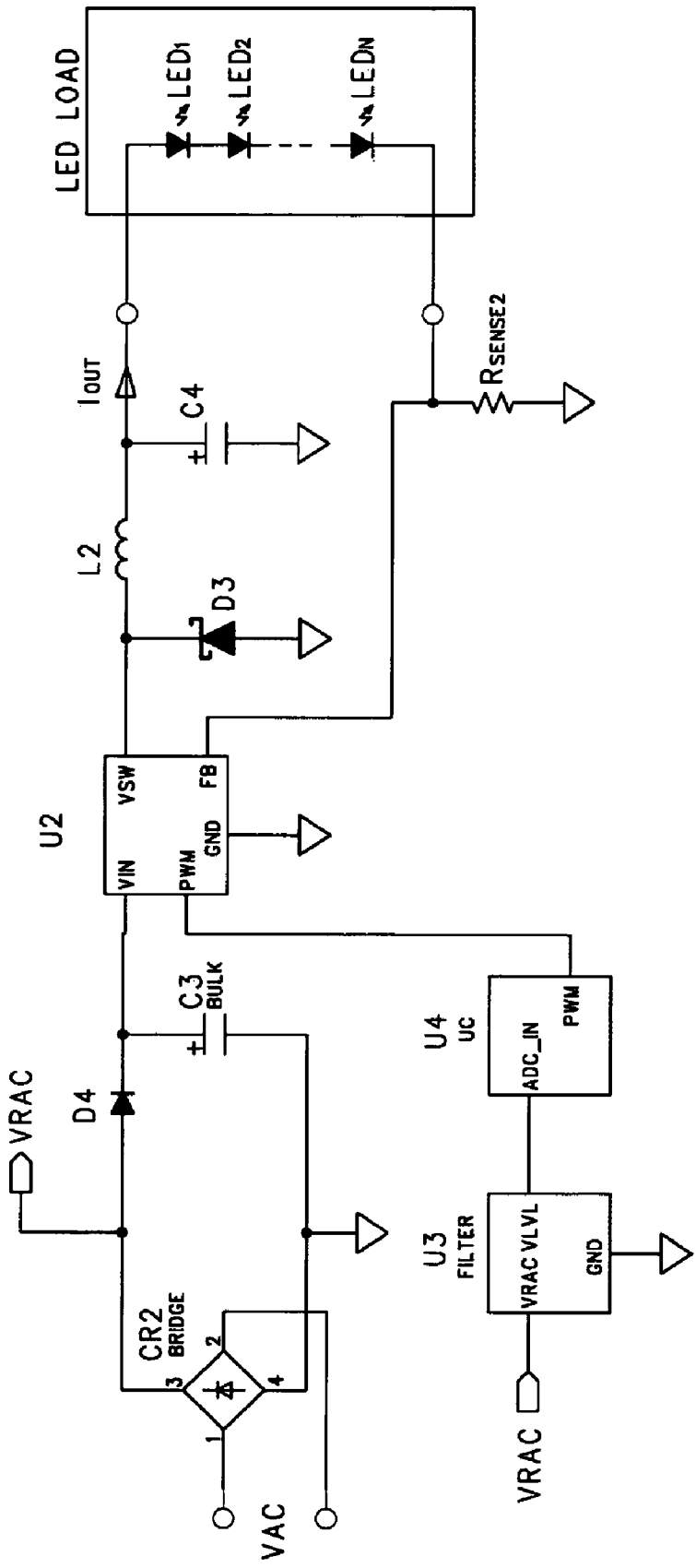
Fig. 9 Modified Dimming LED Driver Implemented In A Buck Regulator Circuit.

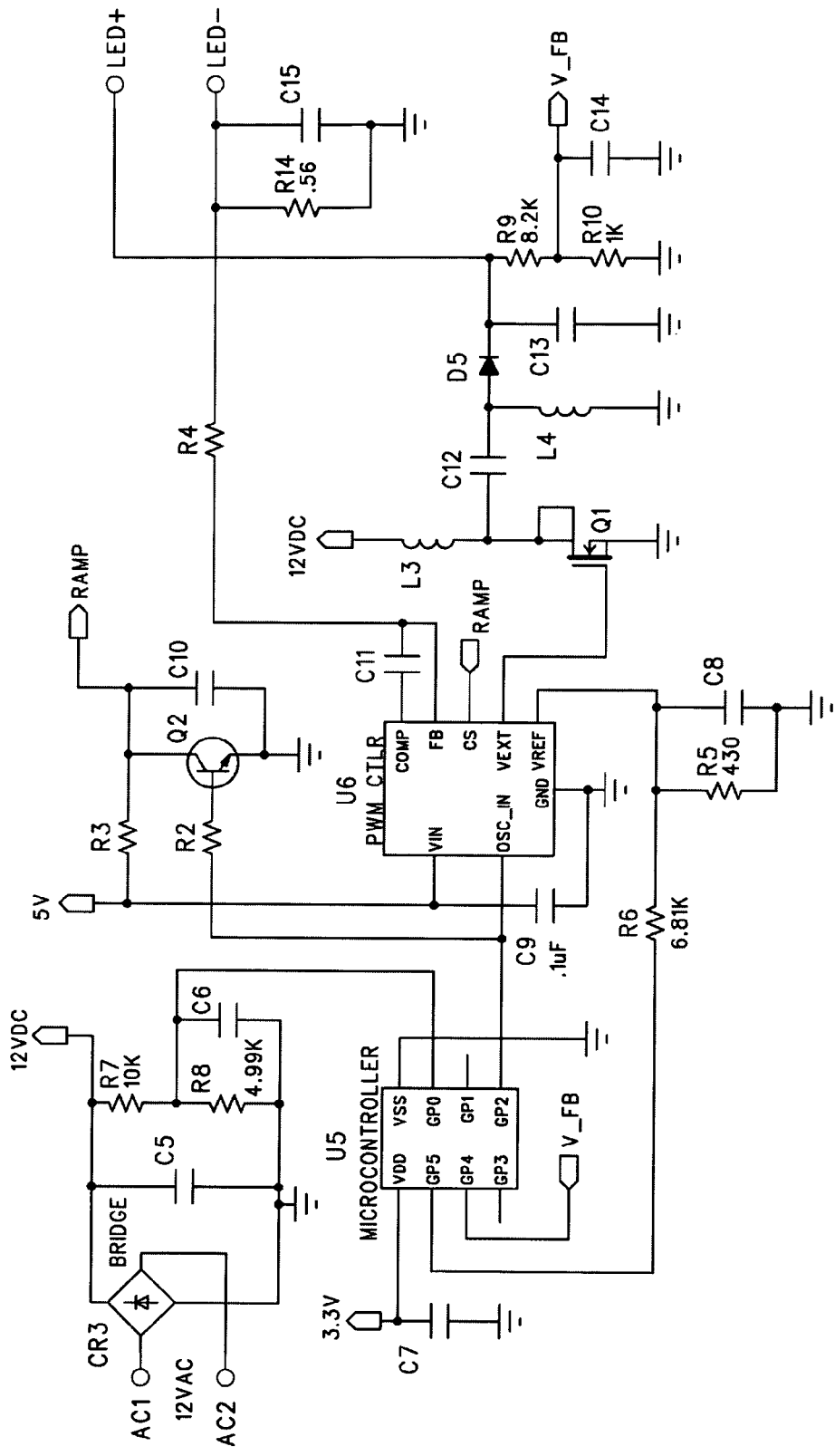
Fig. 10 Modified Dimming LED Driver Implemented in a Buck-Boost Regulator Circuit Fig. 11 Power Circuit For Modified Dimming LED Driver
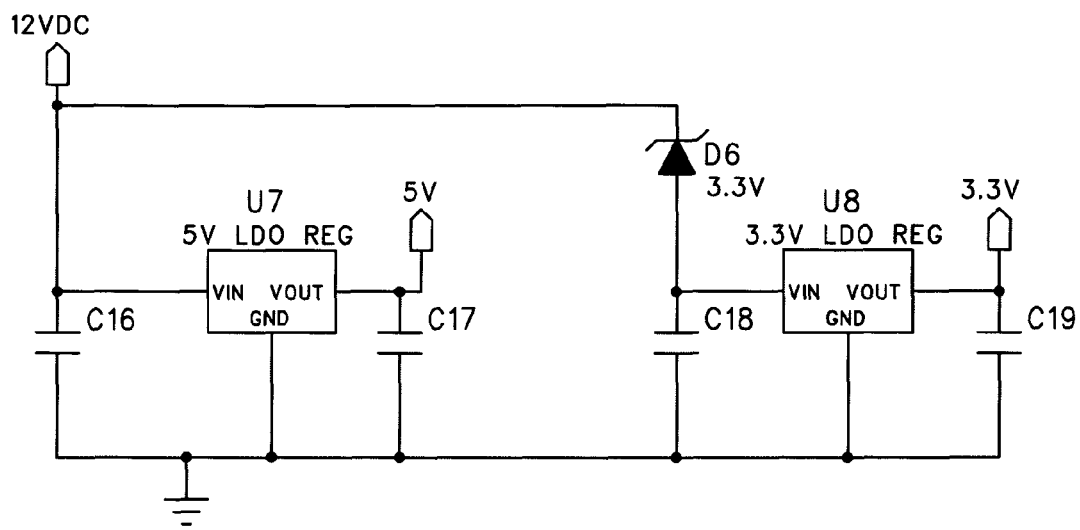

MODIFIED DIMMING LED DRIVER

PRIOR APPLICATION

This current application is a utility application, filed from and benefiting from the earlier filed U.S. Provisional Application No. 61/071,150, filing date Apr. 15, 2008, titled Modified Dimming Led Driver. All of the disclosures of the Provisional application is incorporated herein by reference.

FIELD OF THE INVENTION

This invention relates to drivers for illumination devices such as LEDs (light emitting diodes). The use of LEDs in illumination systems is well known. These devices are especially useful for lighting components, systems, and finished goods. LED lighting is a fast growing segment of the lighting industry due to the efficiency, reliability and longevity of LEDs. Product usage applications include but are not limited to interior and exterior signage, cove lighting, architectural lighting, display case lighting, under water lighting, marine lighting, informational lighting, task lighting, accent lighting, ambient lighting and many others. The present invention includes lighting drivers compatible with LED bulbs, color changing LED strips, LED architectural lights, LED color changing disks, LED traffic/warning lights, LED sign lighting modules and the like. Although the preferred embodiments of the invention are discussed in relation to LED devices, it should be understood that the present invention can be applied to other lighting technologies, such as incandescent, plasma, liquid crystal display or the like. Additionally, the present invention can be applied to switching power supply circuits in general where a variable output voltage or current is desired in response to a varying input voltage waveform such as that produced by standard AC dimmers.

BACKGROUND OF THE INVENTION

LEDs are current-controlled devices in the sense that the intensity of the light emitted from an LED is related to the amount of current driven through the LED. FIG. 1 shows a typical relationship of relative luminosity to forward current in an LED. The longevity or useful life of LEDs is specified in terms of acceptable long-term light output degradation. Light output degradation of LEDs is primarily a function of current density over the elapsed on-time period. LEDs driven at higher levels of forward current will degrade faster, and therefore have a shorter useful life, than the same LEDs driven at lower levels of forward current. It therefore is advantageous in LED lighting systems to carefully and reliably control the amount of current through the LEDs in order to achieve the desired illumination intensity while also maximizing the life of the LEDs.

LED driving circuits, and any circuit which is designed to regulate the power delivered to a load can generally be categorized as either linear or active. Both types of circuits limit either the voltage, or current (or both) delivered to the load, and regulate it over a range of changing input conditions. For example, in an automotive environment the voltage available to an LED driving circuit can range from 9V to 15Vdc. A regulator circuit would preferably be employed to keep the current delivered to the LEDs at a relatively constant rate over this wide input range so that the LED output intensity does not noticeably vary with every fluctuation in the system voltage.

Linear regulators are one type of device or circuit commonly employed to accomplish this task. A linear regulator keeps its output in regulation only as long as the input voltage is greater than the required output voltage plus a required overhead (dropout voltage). Once the input to the regulator drops below this voltage, the regulator drops out of regulation and begins lowering its output in response to a lowering input. In a linear regulation circuit, the input current drawn by the circuit is the same as the output current supplied to the load (plus a negligible amount of current consumed in the regulator itself). As the input voltage presented to the linear regulator rises, the excess power delivered to the system is generally dissipated as heat in the regulator. When the input voltage is above the dropout threshold, the power dissipated in the regulator is directly proportional to the input voltage. For this reason, linear regulators are not very efficient circuits when the input voltage is much larger than the required output voltage. However, when this input to output difference is not too great, linear regulators can be sufficient, and are commonly used due to their simplicity, small size and low cost.

Because linear regulators drop out of regulation when the input is below a certain operating threshold, they can also be employed in LED driving circuits to effect a crude dimming function in response to an input voltage which is intentionally lowered with the desire to reduce the LED intensity. The dimming is "crude" in that it is not a linear response for two reasons. First, in the upper ranges of the input voltage above the dropout threshold, the regulator will hold the output in regulation and the LEDs will not dim at all. Once the dropout threshold is reached, the output voltage will drop fairly linearly with a further drop in input. However, LEDs are not linear devices and small changes in voltage may result in large changes in current which correspondingly effect large changes in output intensity. As the voltage applied to an LED is lowered below a certain threshold, no current will flow through the LED and no light will be produced. FIG. 2 is an example of a linear regulator circuit configured to drive and LED load. FIGS. 3 and 4 give an example of the response of this linear regulated LED circuit to a dimmed input voltage.

The lower power efficiency of linear regulators generally makes them a poor choice in large power systems and in systems where the input voltage is much larger than the required LED driving voltage. As such, these systems typically do not employ them. As LEDs have increased in power and luminous output, it has become common to employ driving circuits that are active, meaning the power delivered to the end system is dynamically adapted to the requirements of the load. This results in increased system efficiency and less heat dissipated by the driving circuitry. Such active driving circuits are commonly implemented using switching regulators configured as buck, boost, or buck-boost regulators with outputs that are set to constant-voltage, or constant-current depending on the circuit. Typically, in LED driving applications, the switching regulator circuit is adapted to sense the current through the LEDs, and dynamically adjust the output so as to achieve and maintain a constant current through the LEDs. FIG. 8 depicts a typical buck regulator circuit configured to drive an LED load at a constant current.

Many switching regulator devices have been specifically designed for driving high powered LEDs. Manufacturers have built into these devices, inputs which can be pulsed with a PWM (pulse width modulation) or PFM (pulse frequency modulation) control signal or other digital pulsing methods in order to effect a lowering of the output of the switching regulator specifically designed to dim the LEDs. Some devices also have analog inputs which lower the output to the LEDs in response to an input which is lowered over an analog range. With such dimming capabilities built into the switching regulators, very accurate linear dimming of the LEDs can be achieved. Such dimming is controlled via a network, or some user interface which generates input signals that are converted to the required digital pulses or analog signals that are sent to the switching regulator driver. This method of dimming in LED lighting systems is common. However, it requires control circuitry and user interface equipment which adds a level of cost and complexity to the lighting system.

In many cases, lighting systems and wiring are already installed, and it is desired to replace these lights with LED lights. Or, it is desired to add LED lights to an existing system and have them work in harmony with lights and equipment which are not LED based. There are common household wall dimmers which are employed to dim incandescent lights, and there are high-end theatrical dimming systems which are used to dim entire lighting installations. These types of dimmers only affect the input voltage delivered to the Lights. There is no additional control signal which is sent to them. Therefore, LED lights which are designed to work in these systems must dim in response to a change in the input voltage.

As noted above, linear regulator based LED drivers will dim in response to a lowering of the input voltage. However the dimming is very non-linear and these regulators are inefficient. Switching regulator drivers will also fall out of regulation and dim their output when the input voltage drops below a certain threshold, but as with linear regulators, when the input is above a threshold, their outputs will be held in regulation and the LED intensity will remain unchanged. And, as in linear regulation circuits, when the switcher circuit is out of regulation, the LED response to the lowering output is very non-linear.

An even greater problem with dimming switching regulator drivers is that these circuits need a certain start-up voltage to operate. Below this voltage, the switching regulator either shuts off completely, or provides sporadic pulses to the LEDs as it attempts to start-up, or passes some leakage current to the LEDs which causes them to glow slightly and never dim to zero. In LED circuits employing multiple lights, each driver circuit can have slightly different thresholds, resulting in differing responses at low dimming ranges. As a result, some lights may flicker, some may be off and some may glow below the threshold voltage. This is unacceptable in most lighting systems that are required to dim using standard ac dimming controllers.

There is a need in the industry for an LED driver based on efficient switching regulators which provides a smooth and linear dimming response to the dimming input voltage that is provided with industry standard ac dimmers, and which can dim the LEDs reliably from 100% to completely off.

It is an object of the present invention to provide an efficient high power LED driver circuit utilizing common switching regulators, capable of dynamically varying the current delivered to the LEDs in proportional response to the varying input voltage provided by standard ac dimmers and dimming systems.

BRIEF DESCRIPTION OF THE DRAWINGS

FIG. 1 is a graph showing a typical relationship of relative luminosity to forward current in an LED.

FIG. 2 is a diagram of a linear regulator circuit as an LED driver.

FIG. 3 is a graph showing the relationship of the luminous intensity of the LEDs versus the input voltage in a linear regulated LED circuit.

FIG. 4 is a graph of the dimming response in a linear regulated LED circuit.

FIG. 5 is an illustration of a typical forward phase control waveform with a dimmer set to half in an ac power system.

FIG. 6 is an illustration of a typical reverse phase control waveform with a dimmer set to half in an ac power system.

FIG. 7 is an illustration of the ac sinewave input and output from an autotransformer set to half.

FIG. 8 is an illustration of a typical buck regulator circuit driving an LED load at a constant current.

FIG. 9 is a block diagram of a Modified Dimming LED driver implemented in a buck regulator circuit.

FIG. 10 is a circuit diagram of one embodiment of the invention implemented in a buck-boost regulator circuit.

FIG. 11 is the power circuit for the Modified Dimming LED Driver shown in FIG. 10.

SUMMARY OF THE INVENTION

The present invention concerns a driver circuit for LED products, particularly those that employ dimming and color changing effects. An advantage of the present invention is that it enhances the dimming response of the Driver through a voltage sensing and control circuit which controls the output of a power regulator through digital or analog feedback. The present invention provides greater control over illumination intensity for LED lighting systems which must respond to typical changes in input voltage produced by standard ac dimmers. Additionally, the present invention is adapted to high-power LED systems incorporating switching regulator driving circuits, providing these benefits in arbitrarily large power LED systems. Further advantages of the invention will become apparent to those of ordinary skill in the art through the disclosure herein.

DETAILED DESCRIPTION OF THE INVENTION

FIGS. 5-7 show the typical shapes of the ac voltage input presented to a light or lighting system by standard ac dimmers. FIG. 5 shows a forward-phase control chopped sinewave typical of most silicon controlled rectifier (SCR) type incandescent wall dimmers. FIG. 6 shows a reverse-phase waveform which is sometimes provided by dimmers made for electronic or capacitive loads. FIG. 7 shows the type of ac voltage waveform presented by an autotransformer, and some higher-end dimming systems designed for theater lighting. In all of these cases, it is the input voltage that is modified (reduced in amplitude or chopped out during part of the sinewave) in order to present a lower average or rms voltage to the load. As explained in the Background section, this type of dimming can cause non-linear and unpredictable results when it is used with a switcher regulator circuit as is often the case in LED lighting products.

The present invention is best understood by starting with a typical implementation of a prior-art switching regulator LED driver circuit. FIG. 8 shows a diagram of a typical buck switching regulator circuit configured to output a constant current to a load. A detailed description of the operation of a buck switching regulator is beyond the scope of this discussion, but can be found in such reference documents as the National Semiconductor application note AN-556, and the article "Understanding Buck Regulators." (See for example, National Semiconductor Application Note AN-556, September 2002, and "Understanding Buck Regulators", Super Nade, Overclockers.com—Nov. 25, 2006 MCP1630/MCP1630V High-Speed Pulse Width Modulator Data Sheet MCP1630 Boost Mode LED Driver Demo Board User's Guide)

Referring to FIG. 8, the rectifier bridge, CR1 transforms the ac input voltage (which alternates in polarity from positive to negative in a sinusoidal fashion) to a rectified (all positive) voltage to the input VIN of the regulator. The bulk capacitor C1 provides storage and smoothes out the rectified ac into a dc voltage. The switching regulator U1 using an internal pass transistor (not shown) will connect the input voltage VIN to the inductor L1 through U1 output VSW. This causes current to flow through the inductor L1, and the capacitor C2 begins to build up a charge. As the C2 voltage builds up, a current will begin to flow through the LED load and feedback resistor $R_{SENSE}$ causing a sense voltage to appear at the U1 feedback input FB according to the equation $FB=I_{OUT} \times R_{SENSE}$. An internal comparator circuit (not shown) within U1 senses when FB reaches a predetermined level, and then disconnects the input VIN from VSW. As the LOAD draws current from the circuit, the capacitor begins to discharge, and the sense voltage FB begins to drop. The switching regulator senses the drop on FB, and then reconnects the input VIN to the inductor L1. based on the values of L1, C1 and the sense resistor $R_{SENSE}$, U1 will preferably continue connecting and disconnecting the input voltage VIN to the inductor L1 in order to keep the output at a level which provides the proper feedback voltage FB. This connecting and disconnecting operation in a pulsed fashion causes the output current $I_{OUT}$ to regulate at a constant level which can be shown from the previous equation to be $I_{OUT}=FB \times R_{SENSE}$. The circuit detailed in FIG. 8 is called a constant current output, because it regulates the output current IOUT that is presented to the load.

FIG. 8 shows an additional input, PWM on the switching regulator U1 which is sometimes available on these regulators, especially recent devices tailored for LED driving applications. This input generally allows the regulator output to be reduced according to the relative duty cycle of the PWM input pulses when such a control signal is presented. These input pulses can represent any digital pulsed modulation technique, provided the frequency and "on" and "off" pulse durations fall within the specified parameter ranges of the regulating device. This input is specifically provided for dimming; however, as explained in the Background section, in the case of an ac input dimmed with standard dimmers, there is no separate control signal available. In these cases, the regulator's PWM input is connected to the VIN so that the regulator U1 is always operating to regulate the output when there is sufficient voltage on the input VIN.

It is an object of the present invention to preferably create a separate dimming control signal from information extracted from the input voltage in order to intelligently lower the output of the switching regulator driver circuit.

FIG. 9 shows a block diagram of the circuit of FIG. 8 with one example of the added circuitry to create such a dimming signal. The bridge CR2 rectifies ac input voltage VAC into the positive voltage VRAC. As in the prior art circuit of FIG. 8, this rectified input is presented to the VIN of the switcher U2, and is smoothed to dc via the bulk capacitor C3. However, there is preferably an added diode D4 which isolates the rectified input VRAC so that it can also be presented to a filter circuit U3. The filter U3 further smoothes and averages the VRAC input so that it can be presented to the analog input of a microcontroller U4. The filter U3 may also contain a voltage divider so that the maximum average voltage filtered from the VRAC input (when there is no dimming) will equal the maximum voltage that can be sampled at the analog input ADC_IN of the microcontroller U4. When the VAC input is dimmed from a standard dimmer, the VRAC will correspondingly lower, and the filter output VLVL will reflect the dimming level by presenting a lower dc signal to the microcontroller's ADC_IN analog input. The microcontroller is preferably programmed to periodically sample this input, and generate a pulsed output signal PWM which is proportional in relative duty cycle to the dimming level of the original VAC input. This signal PWM is preferably input to the switching regulator U2 which correspondingly lowers its output and dims the LEDs.

As noted above, the digital pulsed dimming signal which is referenced here as PWM need not be a strict pulse width modulated signal. Any digital modulation method with parameters adhering to the regulator's specifications for this input may be used. One such method commonly used in power regulator circuits, which is also the method chosen in this embodiment, is pulse frequency modulation (PFM). In PFM, both the cycle frequency and pulse widths of the digital signal are manipulated. Within any given cycle, the relative duty factor (% of total cycle time that the pulse is logic "1") represents the dimming level. However, instead of simply varying this "on" time in a fixed cycle period, the cycle period itself is changed, thus also varying the signal frequency. This can be accomplished by holding the signal's "off" time constant while varying the cycle time, or vice versa. PFM has the added advantage over PWM of distributing the radiated power over a wider frequency range, reducing the radiated electromagnetic noise at any given frequency. Thus, devices can more readily comply with FCC mandated EMI restrictions.

The microcontroller U4 can be programmed to begin dimming at any level of dimmed input, or may be set to hold the switcher output at maximum until a certain dimming level is sensed on VRAC, in this way providing some buffer against unwanted dimming from spurious fluctuations on the ac input. More importantly, the microcontroller can be programmed so that the LEDs are fully dimmed to off at a point in the range of the dimmed VRAC input when there is still sufficient input voltage for the switcher U2 to operate (above its startup threshold). In this way, circuit tolerances between multiple LED lights can be accounted for, and the flickering and glowing seen in prior art implementations when dimmed to a low level can be completely eliminated.

It should be noted that although a microcontroller is used to create the PWM signal to the switcher U2, other circuits may be used such as simple pulse generators, common 555 Timer chips, or other methods. It should also be noted that although this embodiment is generating a PFM signal, other dimming control signals can be generated such as frequency modulated pulse signals, bit-angle modulated pulses, analog signals, or combinations of control signals such as that presented in U.S. Pat. No. 7,088,059 referenced above, and are within the scope of the invention.

Further modifications and adaptations of the invention can be realized through alternate implementations of the regulator circuit, using similar added input voltage sampling and dimming control circuitry. FIGS. 10 and 11 detail one such embodiment of the invention based on a Boost Mode LED driver circuit provided by Microchip Technology Inc. As shown in FIG. 10, the regulator circuit is based on the Microchip MCP1630V High-Speed, Microcontroller-Adaptable, Pulse Width Modulator developed for implementing intelligent power systems. A Detailed explanation of the operation of the MCP1630V and the Boost Mode LED driver circuit can be found in the references sited above. However, following is a basic description of this circuit, including the modifications comprising this embodiment of the invention.

The implementation of the regulator circuit in FIG. 10 is a modification of the standard Boost Mode LED driver provided by Microchip in that the extra capacitor C12 and inductor L4 have been added to convert the regulator topology to a Buck-Boost configuration. In this configuration, the output voltage required to drive the LED load can be higher or lower than the input voltage provided to the circuit. This particular embodiment of the invention is adapted to drive a series string of five one-watt high-intensity LEDs from a dimmable 12Vac input.

Referring to FIG. 10, the 12Vac input is first rectified through the Bridge CR3, and smoothed by the bulk input capacitor C5 to produce the 12VDC input. In actual operation, the 12VDC signal may not be a steady DC level, but may have some amount of ripple based on the size of the input capacitance C5, and considering the high output current (350 mA) presented to the LED load. Assuming a 12Vac sine wave input, the 12VDC will have a peak voltage of $V_{PEAK} = (V_{IN} * \sqrt{2}) - V_{BRIDGE}$ where $V_{BRIDGE}$ is equivalent to two standard diode voltage drops through the Bridge CR3. Therefore, 12VDC will have a peak of about (12*1.414)−(2*0.7)=15.6V. At 3.6 to 4.0V forward voltage drop for the white LEDs intended for this implementation, the five series LED load will require about 18V-20V when driven at the rated 350 mA output, so the regulator will usually be boosting the output voltage in this application.

The resistor R14 in FIG. 10 serves as the output current sense resistor which presents a voltage at the FB pin of the MCP1630V (U6) that is proportional to the output current being supplied to the LED load, which returns through the LED-connection through R14 to ground.

The MCP1630V PWM controller (U6) is comprised of a high-speed comparator, high bandwidth error amplifier and set/reset flip flop, and has a high-current driver output (pin VEXT) used to drive a power MOSFET Q1. It has the necessary components to develop a standard analog switch-mode power supply control loop. The MCP1630V is designed to operate from an external clock source which, in this embodiment, is provided by a microcontroller (U5). The frequency of the clock provided by the GP2 output of U5 and presented to the OSC_IN input of U6, sets the buck-boost power supply switching frequency. The clock duty cycle sets the maximum duty cycle for the supply.

The microcontroller U5 in this embodiment, operates from its own internal oscillator and has an on chip Capture/Compare/PWM (CCP) peripheral module. When operating in PWM mode, the CCP module can generate a pulse-width modulated signal with variable frequency and duty cycles.

In this embodiment, the CCP module in U5 is configured to provide a 500 kHz clock source with 20% duty cycle. The 20% duty cycle produced by the CCP module limits the maximum duty cycle of the MCP1630 to (100%−20%)=80%. The clock frequency and duty cycle are configured once at the beginning of the microcontroller software program, and then left alone.

The CCP output is also connected to a simple ramp generator that is reset at the beginning of each MCP1630V clock cycle. The ramp generator is composed of transistor Q2, resistors R2, R3 and capacitor C10. It provides the reference signal to the MCP1630V comparator through its CS input. The MCP1630V comparator compares this ramp reference signal to the output of its internal error amplifier in order to generate a PWM signal. The PWM signal is output through the high-current output driver on the VEXT pin of U6. This PWM signal controls the on/off duty cycle of the external switching power MOSFET Q1 which sets the power system duty cycle so as to provide output current regulation to the LED load.

A resistor voltage divider (R5 and R6) and filter capacitor C8 is used to set the reference voltage presented to the internal error amplifier of the MCP1630V for the constant current control and is driven by the GP5 pin of the microcontroller U5. With GP5 set to logic level 1, the voltage presented to the resistor divider is 3.3V. The voltage present on the VREF input of U6 will be 3.3V*R5/(R5+R6)=196 mV. Therefore the internal error amplifier of U6 will trip when the voltage presented to the FB pin reaches 196 mV. This occurs when the LED current=0.196/0.56 (R14). So, with the component values shown in the implementation of FIG. 10, the regulated LED current is 350 mA.

R4 and C11 form an integrator circuit in the negative feedback path of the internal error amplifier in U6, providing high loop gain at DC. This simple compensation network is sufficient for a constant current LED driver.

R9 and R10 form a voltage divider that is used to monitor the output voltage of the buck-boost circuit. The output of this voltage divider is connected to pin GP4 of the microcontroller U5 and monitored in the software program to provide failsafe operation in case the LED load becomes an open circuit. Since the buck-boost power circuit would try to increase (boost) the output voltage to infinity in the case of a disconnected load (the error amplifier in U6 would never trip), the software program in the microcontroller U5 monitors the feedback voltage V_FB to ensure it stays at a safe level. In normal operation, the intended 5 LED load would require a maximum of 20V to drive at 350 mA. In this case, V_FB=20V*R10/(R9+R10)=2.2V. If V_FB rises above this level, the microcontroller U5 can shut off the clock to the MCP1630V U6.

L3, Q1, C12, L4, D5, and C13 form a basic voltage buck-boost circuit. Details of the operation of a buck-boost regulator circuit are beyond the scope of this discussion, however, will be understood by those skilled in the art. The value of C13 has been selected to keep the LED current ripple less than 20% at the rated load conditions.

FIG. 11 details the power circuitry used to provide 5V to the MCP1630V (U6 in FIG. 10), and 3.3V to the microcontroller (U5 in FIG. 10). The rectified voltage 12VDC is presented to U7, a 5V low drop out (LDO) linear regulator which provides the input voltage VIN to U6. The 12VDC is also presented to U8, a 3.3V LDO linear regulator which provides the 3.3V to the U5 microcontroller in FIG. 10. In this embodiment of the invention, it is desirable to run the microcontroller U5 at a lower voltage to ensure it has stable power to monitor and control the circuit when the input voltage is dimmed to the point where it is desired to have the LEDs off. The 3.3V Zener diode D6 in FIG. 11 is used to limit the maximum input voltage presented to the MCP1703 regulator U8.

For the circuit of FIGS. 10 and 11 to function as a standard buck-boost regulator and drive a regulated 350 mA current to the output LED load, all that is necessary in the microcontroller U5 software program is to initialize the CCP module in PWM mode as discussed above, in order to produce the clock to the MCP1630V U6, and to drive its output pin GP5 high in order to provide the voltage reference for the MCP1630V control loop.

However, additional circuitry has been added to preferably allow the microcontroller U5 to sample the input voltage, and with modifications to the software, intelligently dim the LED output by controlling the MCP1630V U6. These modifications, which comprise the invention as implemented in this embodiment, will now be explained.

R7, R8, and C6 in FIG. 10 form a voltage divider and filter which samples the rectified input voltage 12VDC from the bridge CR3, and presents it to the microcontroller U5 on input GP0. Note that if the bulk capacitor C5 were large enough to filter the input to DC, the 12VDC voltage level would be 15.6V as explained above, and the voltage at GP0 of U5 would be $V_{GP0}$=15.6*R8/(R7+R8)=5.2V. However, in this implementation, there is considerable ripple on the 12VDC voltage, and the actual voltage presented to GP0 of U5 is much less. The values of these components have been chosen to present 3V to the microcontroller U5 when the input is 12Vac. As the input voltage is dropped below 12Vac using any of the standard dimming methods described in the Background section above, the voltage presented to GP0 of U5 will correspondingly lower. The microcontroller is programmed to monitor this input and execute a dimming algorithm based on the sampled input voltage level.

In this implementation, the dimming algorithm has been set to begin dimming when GP0 drops below 3V, and dim linearly to off when GP0 drops to 50% (1.5V). At 50%, there is still sufficient voltage on the 12VDC line to reliably power the microcontroller U5 and the MCP1650V U6. Thus, a stable linear dimming output is achieved which is consistent from LED lamp to LED lamp, and eliminates the low-end dimming problems of prior-art LED drivers when used in retrofit lamp applications as explained in the Background section above.

The output dimming in this implementation is achieved through manipulation of the VREF reference voltage presented to the internal error amplifier of the MCP1630V U6. As explained above, when the GP5 output of U5 is set high, the VREF input of U6 will be 196 mV, and the output current will regulate at 350 mA which has been chosen to be the maximum (no dimming) current output through the LEDS. With GP5 low, VREF will be 0V, and no current will be output to the LEDs. Under software control, the microcontroller preferably pulses this output in a PFM fashion to cause the LED current to alternate between 0 and 350 mA at a rate that is undetectable to the human eye, and which results in a dimmed illumination level proportional to the PFM duty cycle. As noted above, the output pulses of U5 GP5 need not be PFM. Any other digital modulation technique or a combination of several can be used with equal effectiveness, and should be considered as within the scope of the present invention.

It should also be noted that the value of capacitor C8 in FIG. 10 can be chosen to filter out the GP5 pulses, and integrate them into an analog voltage level so that the LED current reduces in absolute value, rather than pulsed between maximum and minimum levels. Thus, the pulse integration occurs at the circuitry level rather than with the human eye. Additionally, a microcontroller can be chosen for U5 which has an onboard digital-to-analog converter (DAC), so that an analog output voltage is presented to VREF, rather than digital pulses. Or, analog voltages could be provided to VREF by an external DAC which is controlled by the microcontroller U5. All of these methods will be recognized by one skilled in the art as within the scope of the present invention.

Because the microcontroller U5 has complete control over the LED current through its control of the MCP1630V U6, alternate and complex dimming algorithms can be achieved in response to sampled changes in the input voltage. The dimming algorithm discussed above is linear from 350 mA LED current at 12Vac input to 0 LED current at 6Vac input. It may be desirable to have a non-linear response where greater dimming occurs in response to changes in the upper input voltage ranges and less in response to changes at lower ranges to compensate for the greater sensitivity of the human eye at lower light levels. Or, it may be desirable to have the LED lamp mimic the dimming curve seen by a halogen lamp in a fixture in close proximity to the LED lamp.

The present invention provides far greater control over the dimming of an LED lamp than has previously been capable in retrofit or other applications where there is no separate external dimming control signal. It allows for custom and tuned dimming response in systems employing standard AC or DC dimmers which only affect changes in the input voltage to the lamp.

What is claimed is:

1. An illumination control circuit receiving input voltage for powering one or more illumination sources wherein said illumination control circuit comprises:
    an input sensing module receiving said input voltage and comprising:
        a voltage modifier producing an output voltage proportional to said input voltage, and
        a filter removing unwanted voltage fluctuations in said input voltage; and
    a controlling module receiving said output voltage from said input sensing module, and producing one or more output dimming signals to control one or more illumination sources; and
    one or more driver modules receiving said input voltage and said output dimming signals, and producing one or more output currents to drive one or more illumination sources;
    wherein said output currents of said driver modules are controlled according to said output dimming signals of said controlling module to vary the intensity of said illumination sources in proportion to the relative value of said input voltage.

2. The illumination control circuit of claim 1 wherein the relative value of said input voltage is controlled by a dimmer.

3. The illumination control circuit of claim 2 wherein said dimmer is a forward phase control AC dimmer.

4. The illumination control circuit of claim 2 wherein said dimmer is a reverse phase control AC dimmer.

5. The illumination control circuit of claim 2 wherein said dimmer is an autotransformer.

6. The illumination control circuit of claim 1 wherein said controlling module further comprises:
    a microcontroller comprising
        one or more input ports, and
        one or more output signals,
        each of said output signals producing digital pulses between logic "0" and logic "1", each with relative duty cycles individually variable within a range of values.

7. The illumination control circuit of claim 6 wherein said driver modules each further comprise
    a power regulating module comprising
        an input, wherein said input is one of said output signals from said microcontroller, and
        a regulated current output;
    wherein said regulated current output from said power regulating module is controlled according to the relative duty cycle of said digital pulses of said output signals.

8. The illumination control circuit of claim 7 wherein said output signals of said microcontroller are frequency modulated.

9. The illumination control circuit of claim 7 wherein said output signals of said microcontroller are pulse width modulated.

10. The illumination control circuit of claim 7 wherein said output signals of said microcontroller are pulsed with varying frequency and pulse widths.

11. The illumination control circuit of claim 1 wherein said controlling module further comprises:
    a microcontroller comprising
        one or more input ports, and
        one or more analog output signals, each of said analog output signals individually variable in voltage within a range of values.

12. The illumination control circuit of claim 11 wherein said driver modules each further comprise
a power regulating module comprising
an input, wherein said input is one of said analog output signals from said microcontroller, and
a regulated current output;
wherein said regulated current output from said power regulating module is controlled according to the relative voltage level of said analog output signal.

13. The illumination control circuit of claim 1 wherein the illumination sources comprise light emitting diodes.

14. The illumination control circuit of claim 7 wherein the illumination sources comprise light emitting diodes.

15. The illumination control circuit of claim 12 wherein the illumination sources comprise light emitting diodes.

* * * * *